United States Patent
Sun et al.

(10) Patent No.: US 10,270,496 B2
(45) Date of Patent: Apr. 23, 2019

(54) APPARATUS AND METHOD FOR TRANSMITTING/RECEIVING SIGNAL IN WIRELESS COMMUNICATION SYSTEM SUPPORTING DISTRIBUTED ANTENNA SYSTEM

(71) Applicant: Samsung Electronics Co., Ltd., Gyeonggi-do (KR)

(72) Inventors: Pengfei Sun, Beijing (CN); Bin Yu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/502,191

(22) PCT Filed: Aug. 4, 2015

(86) PCT No.: PCT/KR2015/008118
§ 371 (c)(1),
(2) Date: Feb. 6, 2017

(87) PCT Pub. No.: WO2016/021903
PCT Pub. Date: Feb. 11, 2016

(65) Prior Publication Data
US 2017/0230087 A1    Aug. 10, 2017

(30) Foreign Application Priority Data
Aug. 4, 2014    (CN) .......................... 2014 1 0379869

(51) Int. Cl.
*H04W 72/00*      (2009.01)
*H04B 7/024*      (2017.01)
(Continued)

(52) U.S. Cl.
CPC .......... *H04B 7/024* (2013.01); *H04B 7/0689* (2013.01); *H04L 27/264* (2013.01);
(Continued)

(58) Field of Classification Search
CPC ..... H04B 7/024; H04B 7/0689; H04W 16/28; H04W 72/082; H04W 56/0045; H04L 27/264; H04L 27/2655; H04L 27/2646
(Continued)

(56) References Cited

U.S. PATENT DOCUMENTS 8,503,562 B2 *  8/2013  Levy .................. H04L 27/2602
                                                        370/208
9,357,529 B2 *  5/2016  Jeon ....................... H04B 7/024
(Continued)

FOREIGN PATENT DOCUMENTS

WO       2013-109111 A1     7/2013

*Primary Examiner* — Amancio Gonzalez

(57) ABSTRACT

The present disclosure relates to a pre-5th-generation (5G) or 5G communication system to be provided for supporting higher data rates Beyond 4th-generation (4G) communication system such as a long term evolution (LTE). Embodiments of the present disclosure provide a method of a base station in a wireless communication system, including: determining a signal transmission mode to be used by each of antennas based on a channel condition between each of the antennas and a terminal; and transmitting signals to one or more terminals from each of the antennas based on the signal transmission mode.

18 Claims, 8 Drawing Sheets

(51) Int. Cl.
*H04L 27/26* (2006.01)
*H04W 56/00* (2009.01)
*H04B 7/06* (2006.01)
*H04W 16/28* (2009.01)
*H04W 72/08* (2009.01)

(52) U.S. Cl.
CPC ......... *H04L 27/2646* (2013.01); *H04W 16/28* (2013.01); *H04W 56/0045* (2013.01); *H04W 72/082* (2013.01); *H04L 27/2655* (2013.01)

(58) Field of Classification Search
USPC ....................................................... 455/454
See application file for complete search history.

(56) References Cited

U.S. PATENT DOCUMENTS

| | | | |
|---|---|---|---|
| 9,673,883 B2* | 6/2017 | Zhao | H04B 7/0626 |
| 9,942,081 B2* | 4/2018 | Vilaipornsawai | H04L 27/2607 |
| 2010/0190456 A1* | 7/2010 | Asplund | H04B 17/103 |
| | | | 455/106 |
| 2011/0085460 A1 | 4/2011 | Zhang et al. | |
| 2012/0093143 A1 | 4/2012 | Sun et al. | |
| 2013/0083780 A1 | 4/2013 | Luo et al. | |
| 2013/0128764 A1* | 5/2013 | Lee | H04B 7/0695 |
| | | | 370/252 |
| 2014/0078934 A1 | 3/2014 | Hugl et al. | |
| 2015/0016556 A1* | 1/2015 | Chen | H04B 7/0413 |
| | | | 375/267 |

\* cited by examiner

APPARATUS AND METHOD FOR TRANSMITTING/RECEIVING SIGNAL IN WIRELESS COMMUNICATION SYSTEM SUPPORTING DISTRIBUTED ANTENNA SYSTEM

CROSS-REFERENCE TO RELATED APPLICATION AND CLAIM OF PRIORITY

The present application claims priority under 35 U.S.C. § 365 to International Patent Application No. PCT/KR2015/008118 filed on Aug. 4, 2015, entitled "APPARATUS AND METHOD FOR TRANSMITTING/RECEIVING SIGNAL IN WIRELESS COMMUNICATION SYSTEM SUPPORTING DISTRIBUTED ANTENNA SYSTEM", and, to Chinese Patent Application No. 201410379869.1 filed on Aug. 4, 2014, each of which are incorporated herein by reference into the present disclosure as if fully set forth herein.

TECHNICAL FIELD

The present disclosure relates to an apparatus and method for transmitting/receiving a signal in a wireless communication system supporting a distributed antenna system, and more particularly, to an apparatus and method for transmitting/receiving a signal based on a cooperative transmission scheme in a wireless communication system supporting a distributed antenna system.

BACKGROUND

To meet the demand for wireless data traffic, which has increased since deployment of 4th-Generation (4G) communication systems, efforts have been made to develop an improved 5th-Generation (5G) or pre-5G communication system. Therefore, the 5G or pre-5G communication system is also called a 'Beyond 4G Network' or a 'Post Long-Term Evolution (LTE) System'.

It is considered that the 5G communication system will be implemented in millimeter Wave (mmWave) bands, e.g., 60 GHz bands, so as to accomplish higher data rates. To reduce propagation loss of radio waves and increase a transmission distance, a beam forming technique, a massive multiple-input multiple-output (MIMO) technique, a Full Dimensional MIMO (FD-MIMO) technique, an array antenna technique, an analog beam forming technique, and a large scale antenna technique are discussed in 5G communication systems.

In addition, in 5G communication systems, development for system network improvement is under way based on advanced small cells, cloud Radio Access Networks (RANs), ultra-dense networks, a device-to-device (D2D) communication, a wireless backhaul, a moving network, a cooperative communication, Coordinated Multi-Points (CoMP), reception-end interference cancellation, and the like.

In the 5G system, a Hybrid Frequency Shift Keying (FSK) and Quadrature Amplitude Modulation (QAM) Modulation (FQAM) and a Sliding Window Superposition Coding (SWSC) as an Advanced Coding Modulation (ACM) scheme, and a Filter Bank Multi Carrier (FBMC) scheme, a Non-Orthogonal Multiple Access (NOMA) scheme, and a Sparse Code Multiple Access (SCMA) scheme as an advanced access technology have been developed.

With the rapid development of the information industry, the wireless communication technology is faced with unprecedented challenges in the future. In the foreseeable future, the need for wireless data services in the world will keep high growth. According to a report from the international telecommunication union (ITU), wireless data services will increase at least 1000 times by 2020. In particular countries and regions, the number may be even higher. In response to the unprecedented challenges, 5G communication technologies research has been extensively launched across the world. The enhancement of spectrum efficiency as well as the new allocation of frequency resources and the increase of frequency reusing factor are widely considered as the crux of the 1000 times service boosting.

Among various potential technologies capable of enhancing spectrum efficiency, the distributed antenna technology is proved as a practical and effective method. Compared with a centralized multi-antenna system, the distributed antenna system may flexibly achieve the cooperative transmission between multiple antennas via the multiple antennas deployed on different spatial positions. For example, the distributed antenna system may coordinate the interference between multiple users utilizing cooperative beam-forming. Therefore, the distributed antenna system may achieve a higher peak transmission rate, smarter interference management and a more reliable cell-edge data transmission. Based on above mentioned advantages, the distributed antenna system is gradually introduced in the latest wireless communication standards, such as the coordinated multipoint transmission and reception (CoMP) method in the long term evolution (LTE) system corresponding to the evolved universal terrestrial radio access (E-UTRA) protocol defined by the 3rd generation partnership project (3GPP).

Although being capable of better increasing the spectrum efficiency of the communication system, the distributed antenna system also raises more rigorous implementation conditions during the practical deployment process [1]. In order to achieve some multi-antenna cooperative transmission, such as joint processing (JP), it is necessary for the multiple antennas to maintain a high synchronization precision, so as to ensure that signals transmitted from different antennas can maintain a better time-frequency consistency at the receiving end, that is, signals transmitted from multiple antennas should arrive at antennas of the receiving end with a minimum time difference, and carrier frequency offsets between the multiple signals should be as small as possible. In order to obtain the time-frequency consistency, the existing system will define a corresponding requirement standard regarding devices and deployment based on the signal frame structure used by the system, so as to guarantee that the system performance will not have a significant loss due to the imperfect time-frequency offset. For instance, in an LTE system based on the orthogonal frequency division multiplexing (OFDM) modulation, the time difference of arrival (TDOA) of signals transmitted from different antennas may be restricted to the length of a cyclic prefix (CP). That is to say, the sum of an antenna time delay and a transmission time delay is less than the length of the CP.

However, in the future communication system, it may be more difficult to satisfy the rigid time-frequency synchronization requirement. On one hand, with the cell densification, the rigid time-frequency synchronization will bring high deployment costs due to the large scale demand for large-bandwidth and low-latency fiber-optic backbone network. One the other hand, the short sub-frame structure [2] possibly used by the air-interface in the future communication system will severely limit the application of the distributed antenna system. For example, because the high frequency communication which has attracted more and more attention adopts higher frequency-band, the OFDM system used by the communication system will become more sensitive to the Doppler shift. Therefore, it is necessary to shorten the length of the signal to obtain larger carrier spacing. For example, for a high frequency communication system using 28 GHz, the carrier spacing thereof is designed to be 270 kHz to accommodate the Doppler shift caused by mobile communication. Therefore, the length of the OFDM symbol used by the system is 3.70 µs, and the length of the CP is 0.46 µs. When the distributed antenna system is used under such frame structure, even if the time for transmitting signals from multiple antennas is strictly synchronous, the difference between distances from the user to each of multiple antennas will result in serious time dis-synchronization. For instance, when the difference between two distances from a user to one antenna and from the user to another antenna is 140 m, the TDOA of signals transmitted from the two antennas will be larger than the length of the CP (0.47 µs). When the multi-path effect is considered, the TDOA passing through channels of multiple paths will become larger. Since the time difference is larger than the length of the CP, the received multipath signals will suffer serious inter-carrier interference (ICI) and inter-symbol interference (ISI), thus the reliability of signal reception will be degraded greatly. The high frequency communication is only one scenario of the short sub-frame, and the low frequency communication may also use the short sub-frame to reduce the transmission delay [2]. In addition, even if a longer sub-frame structure is used in the low frequency communication, the time difference of receiving signals may be too large resulted from the time delay of the backbone network and imperfect components. On the other hand, although the usage of the CP simply solves the problem of channel delay spread, the CP also reduces the spectrum efficiency of the system. Due to above mentioned time delay difference of the distributed antenna system, the system may need a longer CP to guarantee the reliability of signal reception, which will no doubt further reduce the spectrum efficiency of the system.

REFERENCES

[1] Section 29.5.1, "LTE—The UMTS long term evolution";
[2] METIS Deliverable D2.1: requirement analysis and design approaches for 5G air interface https://www.metis2020.com/wp-content/uploads/deliverables/METIS_D2.1_v1.pdf The above information is presented as background information only to assist with an understanding of the present disclosure. No determination has been made, and no assertion is made, as to whether any of the above might be applicable as prior art with regard to the present disclosure.

SUMMARY

An embodiment of the present disclosure proposes an apparatus and method for transmitting/receiving a signal in a wireless communication system supporting a distributed antenna system.

An embodiment of the present disclosure proposes an apparatus and method for transmitting/receiving a signal based on a cooperative transmission scheme in a wireless communication system supporting a distributed antenna system.

An embodiment of the present disclosure proposes an apparatus and method for transmitting/receiving a signal by considering channel quality in a wireless communication system supporting a distributed antenna system.

An embodiment of the present disclosure proposes an apparatus and method for transmitting/receiving a signal thereby synchronizing signal reception timing points of a plurality of antennas in a wireless communication system supporting a distributed antenna system.

An embodiment of the present disclosure proposes an apparatus and method for transmitting/receiving a signal thereby decreasing time delay of signals which are received through a plurality of antennas in a wireless communication system supporting a distributed antenna system.

An embodiment of the present disclosure proposes an apparatus and method for transmitting/receiving a signal thereby guaranteeing reception reliability in a wireless communication system supporting a distributed antenna system.

An embodiment of the present disclosure proposes an apparatus and method for transmitting/receiving a signal thereby increasing spectrum efficiency in a wireless communication system supporting a distributed antenna system.

An embodiment of the present disclosure proposes an apparatus and method for transmitting/receiving a signal thereby increasing an effective transmission rate in a wireless communication system supporting a distributed antenna system.

In view of above, embodiments of the present disclosure provide a cooperative transmission method, base station and terminal applicable in a distributed antenna system, so as to effectively solve the problem of non-synchronous arrival of signals coming from multiple antennas, and guarantee that the user can receive signals coming from different antennas in a better condition, and obtain maximal effective transmission rate.

The method for transmitting/receiving a signal in a wireless communication system supporting a distributed antenna system provided by embodiments of the present disclosure includes: transmitting at least one signal to at least one terminal through each of antennas included in the distributed antenna system, wherein the at least one signal which is transmitted through each of the antennas is a signal to which a signal transmission mode which is determined based on a channel condition between the at least one terminal and each of the antennas is applied.

Preferably, wherein the at least one signal which is transmitted through each of the antennas is a signal to which a predetermined modulation method is applied, and wherein the modulation method includes one of a prototype filter based single-carrier modulation method, filter bank multi-carrier (FBMC) modulation method, and a prototype filter based multi-carrier modulation method.

Preferably, the method further includes: transmitting spatial distribution information for each of the antennas and reference signal information to the at least one terminal; and receiving channel condition information indicating the channel condition between the at least one terminal and each of the antennas from the at least one terminal.

Preferably, wherein the channel condition information includes a difference between time delays from each of the antennas to the at least one terminal, and a multi-antenna transmission mode under different time-delay differences, and wherein the signal transmission mode which is applied to each of the antennas includes signal transmitting time used by each of the antennas and a multi-antenna transmission mode according to the time-delay difference.

Preferably, wherein the multi-antenna transmission mode includes one of beam forming, a spatial diversity, and spatial multiplexing.

Preferably, wherein there is a timing advance between signal transmitting time of each of the antennas, and the timing advance makes a difference between time that signals transmitted from each of the antennas arrive at the same terminal be minimum.

Preferably, the method further includes: setting a synchronous channel and an asynchronous channel for each of the antennas, transmitting signals in the synchronous channel at reference time that is not terminal specific, and transmitting signals in the asynchronous channel at terminal specific time, wherein each of the antennas possesses a capability of respectively transmitting synchronous channel signals and/ or asynchronous channel signals for different terminals, and each of the antennas possesses a capability of simultaneously transmitting synchronous channel signals and asynchronous channel signals.

Preferably, the method further includes: transmitting a reference signal for channel measurement at the reference time that is not terminal specific through each of the antennas; and transmitting a reference signal for data demodulation from each of the antennas at the terminal specific time through each of the antennas, wherein the reference signal is used for determining, by the at least one terminal, the difference between time delays from each of the antennas to the at least one terminal.

Preferably, wherein the channel condition between each of the antennas and the at least one terminal includes modulation waveform parameters to be used by each of the antennas and a multi-antenna transmission mode, and wherein a signal transmission mode which is applied to each of the antennas includes modulation waveform parameters which is applied to each of the antennas and a multi-antenna transmission mode.

Preferably, wherein the modulation waveform parameters include a modulation waveform length, multi-carrier spacing, and a repetition factor used by modulation signals.

The base station in a wireless communication system supporting a distributed antenna system provided by embodiments of the present disclosure includes: a transmitter configured to transmit at least one signal to at least one terminal through each of antennas included in the distributed antenna system, wherein the at least one signal which is transmitted through each of the antennas is a signal to which a signal transmission mode which is determined based on a channel condition between the at least one terminal and each of the antennas is applied.

Preferably, wherein the at least one signal which is transmitted through each of the antennas is a signal to which a predetermined modulation method is applied, and wherein the modulation method includes one of a prototype filter based single-carrier modulation method, a Filter Bank Multi-Carrier (FBMC) modulation method, and a prototype filter based multi-carrier modulation method.

Preferably, the base station further includes: a receiver, wherein the transmitter transmits spatial distribution information for each of the antennas and reference signal information to the at least one terminal, and wherein the receiver receives channel condition information indicating the channel condition between the at least one terminal and each of the antennas from the at least one terminal.

Preferably, wherein the channel condition information includes a difference between time delays from each of the antennas to the at least one terminal, and a multi-antenna transmission mode under different time-delay differences, and wherein the signal transmission mode which is applied to each of the antennas includes signal transmitting time used by each of the antennas and a multi-antenna transmission mode according to the time-delay difference.

Preferably, wherein the multi-antenna transmission mode includes one of beam forming, a spatial diversity, and spatial multiplexing.

Preferably, wherein there is a timing advance between signal transmitting time of each of the antennas, and the timing advance makes a difference between time that signals transmitted from each of the antennas arrive at the same terminal be minimum.

Preferably, wherein the transmitter sets a synchronous channel and an asynchronous channel for each of the antennas, transmits signals in the synchronous channel at reference time that is not terminal specific, and transmits signals in the asynchronous channel at terminal specific time, wherein each of the antennas possesses a capability of respectively transmitting synchronous channel signals and/ or asynchronous channel signals for different terminals, and each of the antennas possesses a capability of simultaneously transmitting synchronous channel signals and asynchronous channel signals.

Preferably, wherein the transmitter transmits a reference signal for channel measurement at the reference time that is not terminal specific through each of the antennas, and transmits a reference signal for data demodulation from each of the antennas at the terminal specific time through each of the antennas, and wherein the reference signal is used for determining, by the at least one terminal, the difference between time delays from each of the antennas to the at least one terminal.

Preferably, wherein the channel condition between each of the antennas and the at least one terminal includes modulation waveform parameters to be used by each of the antennas and a multi-antenna transmission mode, and wherein a signal transmission mode which is applied to each of the antennas includes modulation waveform parameters which is applied to each of the antennas and a multi-antenna transmission mode.

Preferably, wherein the modulation waveform parameters include a modulation waveform length, multi-carrier spacing, and a repetition factor used by modulation signals.

The method for transmitting/receiving a signal in a wireless communication system supporting a distributed antenna system provided by embodiments of the present disclosure includes: receiving spatial distribution information of antennas included in the distributed antenna system and reference signal information from a base station; measuring a reference signal according to the spatial distribution information of the antennas, and obtaining a time difference of arrival (TDOA) of signals transmitted from each of the antennas to the terminal; and returning information related to a channel condition between each of the antennas and the terminal to the base station based on the TDOA.

Preferably, the method further includes: receiving signals from each of the antennas, wherein the signal is transmitted from each of the antennas is a signal to which a signal transmission mode which is determined based on a channel condition between the terminal and each of the antennas is applied.

Preferably, wherein returning the channel condition between each of the antennas and the terminal to the base station comprises: taking the TDOA of signals transmitted from each of the antennas to the terminal as the channel condition between each of the antennas and the terminal, and returning the channel condition to the base station; or determining corresponding modulation waveform parameters and a multi-antenna transmission mode according to the TDOA of signals transmitted from each of the antennas to the terminal, taking the modulation waveform parameters and a multi-antenna transmission mode as the channel condition between each of the antennas and the terminal, and returning the channel condition to the base station.

The terminal in a wireless communication system supporting a distributed antenna system provided by embodiments of the present disclosure includes:

a receiver configured to receive spatial distribution information of antennas included in the distributed antenna system and reference signal information from a base station;

a controller configured to measure a reference signal according to the spatial distribution information of the antennas, and obtain a time difference of arrival (TDOA) of signals transmitted from each of the antennas to the terminal; and a transmitter configured to perform an operation of returning information related to a channel condition between each of the antennas and the terminal to the base station based on the TDOA.

Preferably, wherein the receiver receives signals from each of the antennas, and wherein the signal is transmitted from each of the antennas is a signal to which a signal transmission mode which is determined based on a channel condition between the terminal and each of the antennas is applied.

Preferably, wherein the operation of returning the channel condition between each of the antennas and the terminal to the base station comprises:

an operation of taking the TDOA of signals transmitted from each of the antennas to the terminal as the channel condition between each of the antennas and the terminal, and returning the channel condition to the base station, or an operation of determining corresponding modulation waveform parameters and a multi-antenna transmission mode according to the TDOA of signals transmitted from each of the antennas to the terminal, taking the modulation waveform parameters and a multi-antenna transmission mode as the channel condition between each of the antennas and the terminal, and returning the channel condition to the base station.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of certain exemplary embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
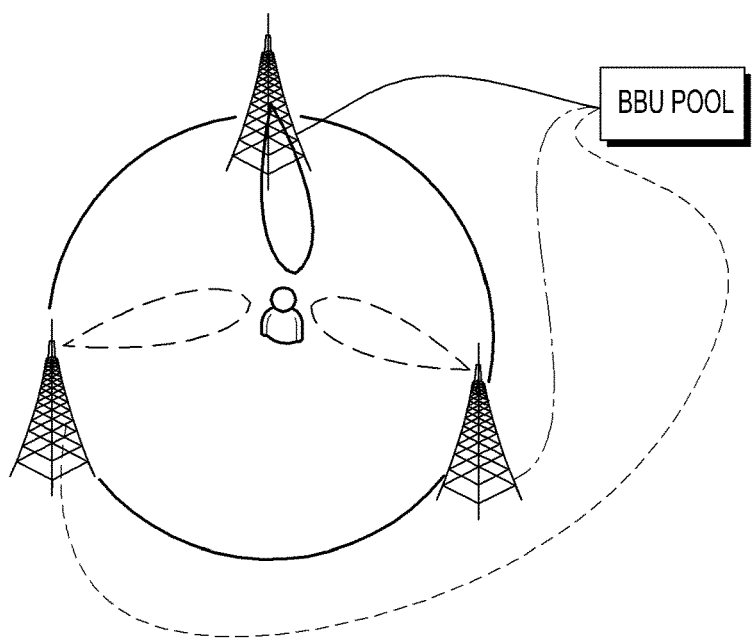
FIG. 1 is a schematic diagram illustrating a distributed antenna system.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a digital video disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

An embodiment of the present disclosure proposes an apparatus and method for transmitting/receiving a signal in a wireless communication system supporting a distributed antenna system.

An embodiment of the present disclosure proposes an apparatus and method for transmitting/receiving a signal based on a cooperative transmission scheme in a wireless communication system supporting a distributed antenna system.

An embodiment of the present disclosure proposes an apparatus and method for transmitting/receiving a signal by considering channel quality in a wireless communication system supporting a distributed antenna system.

An embodiment of the present disclosure proposes an apparatus and method for transmitting/receiving a signal thereby synchronizing signal reception timing points of a plurality of antennas in a wireless communication system supporting a distributed antenna system.

An embodiment of the present disclosure proposes an apparatus and method for transmitting/receiving a signal thereby decreasing time delay of signals which are received through a plurality of antennas in a wireless communication system supporting a distributed antenna system.

An embodiment of the present disclosure proposes an apparatus and method for transmitting/receiving a signal thereby guaranteeing reception reliability in a wireless communication system supporting a distributed antenna system.

An embodiment of the present disclosure proposes an apparatus and method for transmitting/receiving a signal thereby increasing spectrum efficiency in a wireless communication system supporting a distributed antenna system.

An embodiment of the present disclosure proposes an apparatus and method for transmitting/receiving a signal thereby increasing an effective transmission rate in a wireless communication system supporting a distributed antenna system.

FIG. 1 is a schematic diagram illustrating a distributed antenna system applicable in the method. Multiple antennas are distributed at different spatial positions. Via data links, data from the multiple antennas may arrive at a Baseband unit pool (BBU pool) for centralized processing. With the scheduling of the BBU pool, the multiple distributed antennas may serve the same user. According to different channel conditions, the BBU pool may adopt different transmission modes, for instance, the BBU pool may transmit multi-streaming signals utilizing spatial multiplexing or transmit single-streaming signals utilizing beam forming, to obtain higher transmission reliability. As can be known from FIG. 1, since the distances between the user and each of the antennas are different, even though signals are transmitted from each of antennas at the same time, the time that signals transmitted from different antennas arrive at the user side will be different. When the system utilizes the OFDM modulation, and if the adopted CP is long enough, the time difference of the signals will be less than the length of the CP, thus the receiving end may completely receive effective signals transmitted from all antennas by using a fixed reception window. Therefore, the multi-antenna system possesses a good synchronization of received signals.

However, in the future mobile communication system, it is difficult to guarantee the synchronization of received signals only depending on the CP protection. For example, if a system adopts high frequency communication, the length of the OFDM symbol and the length of the CP will be largely shortened to obtain high carrier spacing. In a multi-antenna system, even a small user-antenna distance difference may lead to that the TDOA of the signals is larger than the length of the CP. Another example, in order to obtain a shorter transmission delay, the future mobile communication system may adopt shorter frame structure, which will bring about the same time difference problem as the high frequency communication. Yet another example, in order to reduce the costs of network deployment, the base station or antenna may use a low precision component, and the low precision component cannot guarantee the time synchronization for transmitting signals, which may also lead to that the time difference that the signals arrive at the receiving end is relatively large. When the TDOA of the signals is too large, the signals using ODFM modulation will suffer serious ICI and ISI, thus the reception performance will be largely degraded. Therefore, if the ICI and ISI influence caused by the TDOA of the signals cannot be overcome, the entire distributed antenna system will be faced with serious performance loss.

To solve above mentioned problem, embodiments of the present disclosure provides a proactive cooperative transmission method to improve the transmission reliability of the distributed antenna system, the main idea of the method is: according to the channel condition between a user and multiple antennas distributed on different spatial positions, a signal transmission mode to be used by each of antennas is determined, signals are transmitted to the user from each antenna using the corresponding signal transmission mode.

In the present disclosure, the modulation technology used by the signal transmission is: a modulation method capable of generating signal waveform having a better time-frequency localization property. The modulation technology includes but is not limited to prototype filter based single-carrier modulation, filter bank multi-carrier (FBMC) modulation, or prototype filter based multi-carrier modulation.

Determining the signal transmission mode to be used by each of antennas may include: determining the signal transmitting time used by each of the antennas and a corresponding multi-antenna transmission mode; or determining specific parameters used by modulation waveform of each of antennas and a corresponding multi-antenna transmission mode.

In subsequent description of the present disclosure, the FBMC waveform will be taken as an example, but the present disclosure is not limited to the FBMC waveform, for example, filtered OFDM, generalized frequency domain multiple (GFDM), single carrier-FBMC, and the like, are also applicable in the present disclosure.

Figure 2:
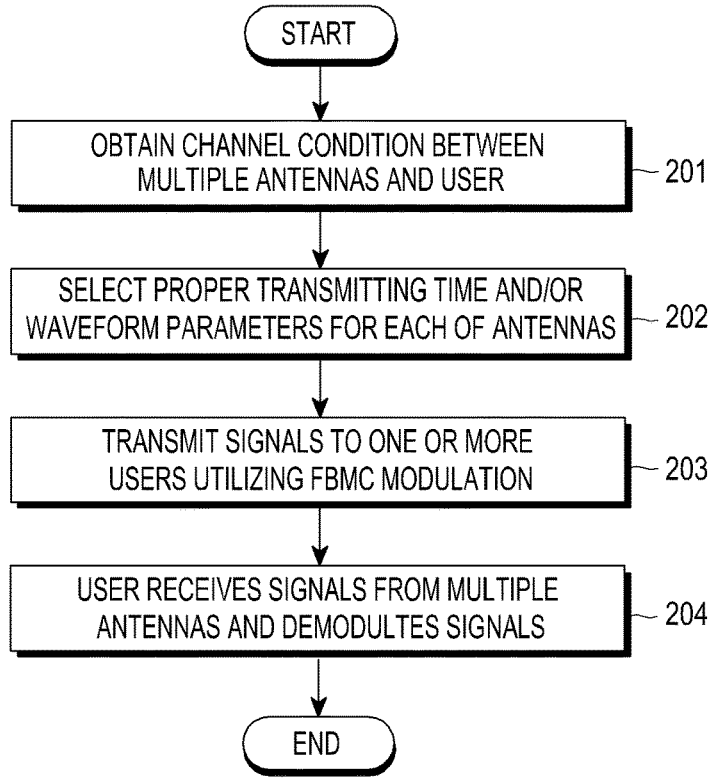
FIG. 2 is a flowchart illustrating a cooperative transmission method according to an embodiment of the present disclosure.

As shown in FIG. 2, the proactive cooperative transmission method provided by embodiments of the present disclosure may include the following operations.

In block 201, a base station obtains a channel condition between multiple antennas and a user.

Because there is a one-to-one corresponding relationship between the user and a terminal, unless particularly stated, the "channel condition between multiple antennas and the user" in the present disclosure means "channel condition between multiple antennas and the terminal".

The channel condition between multiple antennas and the user may be delay between each of antennas and the user, or modulation waveform parameters selected to be used by each of antennas and a corresponding multi-antenna transmission mode. The multi-antenna transmission mode includes: beam forming, space diversity or spatial multiplexing.

Before block 201, it is necessary for the base station to notify the user of spatial distribution information of the antennas and reference signal information, and then, the user measures the reference signal based on the spatial distribution information of the antennas to obtain the TDOA of the signals. The TDOA may be calculated by taking signals transmitted from an antenna specified by a network as the reference, and calculating the time difference between the time of arrival of signals transmitted from other antennas and the reference time.

After the time difference is obtained, in a preferable method, the user may report the time difference to the network side. Preferably, the user may report the time difference periodically, or report the time difference when the time difference reaches a preset threshold.

In another preferable method, the user may calculate preferable modulation waveform parameters and corresponding multi-antenna transmission mode according to the time difference, and report the modulation waveform parameters and corresponding multi-antenna transmission mode to the network side.

In block 202, the base station, according to obtained channel condition, determines signal transmitting time of each of the antennas and a corresponding multi-antenna transmission mode, or determines modulation waveform parameters of each of antennas and a corresponding multi-antenna transmission mode.

In block 203, each of the antennas transmits signals to one or more users utilizing FBMC modulation. The signals include user data and a reference signal.

When transmitting signals according to determined signal transmitting time of each of the antennas and a corresponding multi-antenna transmission mode, the method may include the following: defining a synchronous channel, transmitting signals in the synchronous channel at non UE specific reference time; the synchronous channel is used to transmit user data, control information and broadcast information; defining an asynchronous channel, transmitting signals in the asynchronous channel at time with UE specific timing advance; the asynchronous channel is used to transmit user data and control information.

When transmitting signals in the asynchronous channel with UE specific timing advance, multiple timing advance values may be predefined, when signals of one user is transmitted, one of values is selected, the selected value makes the time difference that signals transmitted from multiple antennas arrive at the receiving end be as small as possible.

Above mentioned timing advance value may be designed according to the tolerance of modulation waveform to time offset and communication system deployment scenario. The design principles may be that the network is always able to find a proper timing advance value, to make signals transmitted from multiple antennas arrive at the receiving end with a small time difference.

Different antennas can either transmit synchronous channel signals for different users, or transmit asynchronous channel signals for different users. The same antenna may transmit synchronous channel signals and asynchronous channel signals at the same time.

When transmitting signals to one or more users, the method may include the following: each of antennas selects proper time and method to transmit different reference signals; each of antennas transmits a reference signal used for channel measurement at non UE specific reference time, so that the user may measure the TDOA of multiple antennas according to the reference signal; each of antennas transmits a reference signal used for data demodulation at the same transmitting time as the user data, that is, the demodulation reference signal uses the same timing advance value as the user data signal.

When transmitting signals to one or more users, the method may further include the following: guard time or a puncture operation is set between different sub-frames so as to avoid a collision between a previous sub-frame using reference transmitting time and a current sub-frame using a timing advance, namely to avoid the collision between adjacent sub-frames.

Furthermore, the specific parameters used by modulation waveform may include: a prototype filter (bank) parameter, the modulation waveform length, the multi-carrier spacing and a repetition factor used by signals.

Preferably, multiple groups of modulation waveform parameters may be predefined, and then an optimal group of modulation waveform parameters may be selected for transmitting signals. The selection rule is that signals using the group of modulation waveform parameters are able to tolerate the maximal time delay when transmitted from multiple antennas to the user, and can be reliably received by the receiving end.

In block 204, the user receives the signals from multiple antennas and demodulates the signals.

The embodiments of the present disclosure will be described with reference to multiple examples hereinafter.

In a first example, a wireless communication system using FBMC modulation technology will be described.

TABLE 1

| System bandwidth (MHz) | 250 |
| --- | --- |
| Sampling rate (MHz) | 276.48 |
| Subcarrier spacing (kHz) | 270 |
| OFDM symbol length (FFT size) | 1024 |
| OFDM symbol duration (µs) | 3.70 |
| CP length | 128 |
| CP duration (µs) | 0.46 |

In the example, a specific implementation method of the wireless communication system using FBMC modulation technology is given. To facilitate understanding, the wireless communication system is compared to a conventional OFDM system. Suppose parameters of the OFDM system are shown in table 1, a time-domain signal of the OFDM may be generated according to the following formula (1):

$$s(m) = \frac{1}{\sqrt{M}} \sum_{k=0}^{M-1} a(k)\exp(2j\pi mk/M) \quad (1)$$

In which, M=1024 is the signal length; a(k) is a modulated QAM signal.

Correspondingly, a time-domain signal of the FBMC may be generated according to the following formula (2):

$$s(m) = \sum_{k=0}^{M-1} \sum_{n=0,1} a(k,n)g(m-nM/2)\exp(2j\pi nk/M)\exp(j\phi_{k,n}) \quad (2)$$

$$\phi_{k,n} = \frac{\pi}{2}(n+k) - \pi k$$

In which, g(m) m=0, 1, . . . , KM−1 is a time-domain parameter of the prototype filter; a(k, n) is a modulated PAM signal.

In a FBMC transmission system, K FBMC symbols overlap each other, in which, K is a repetition factor. Parameters of one FBMC system of which K=4 and another FBMC system of which K=2 are respectively described in table 2. The two FBMC systems use the same bandwidth and subcarrier spacing, and since using different repetition factors, the FBMC symbol lengths of the two FBMC systems are different.

TABLE 2

| Repetition factor | K = 4 | K = 2 |
| --- | --- | --- |
| System bandwidth (MHz) | 250 | 250 |
| Sampling rate (MHz) | 276.48 | 276.48 |
| Subcarrier spacing (kHz) | 270 | 270 |
| FBMC symbol length | 4096 | 2048 |
| FBMC symbol duration (us) | 14.8 | 7.4 |
| CP length | 0 | 0 |
| CP duration (us) | 0 | 0 |

In a second example, the proactive cooperative transmission method applicable in the multi-antenna system will be described.

Figure 3:
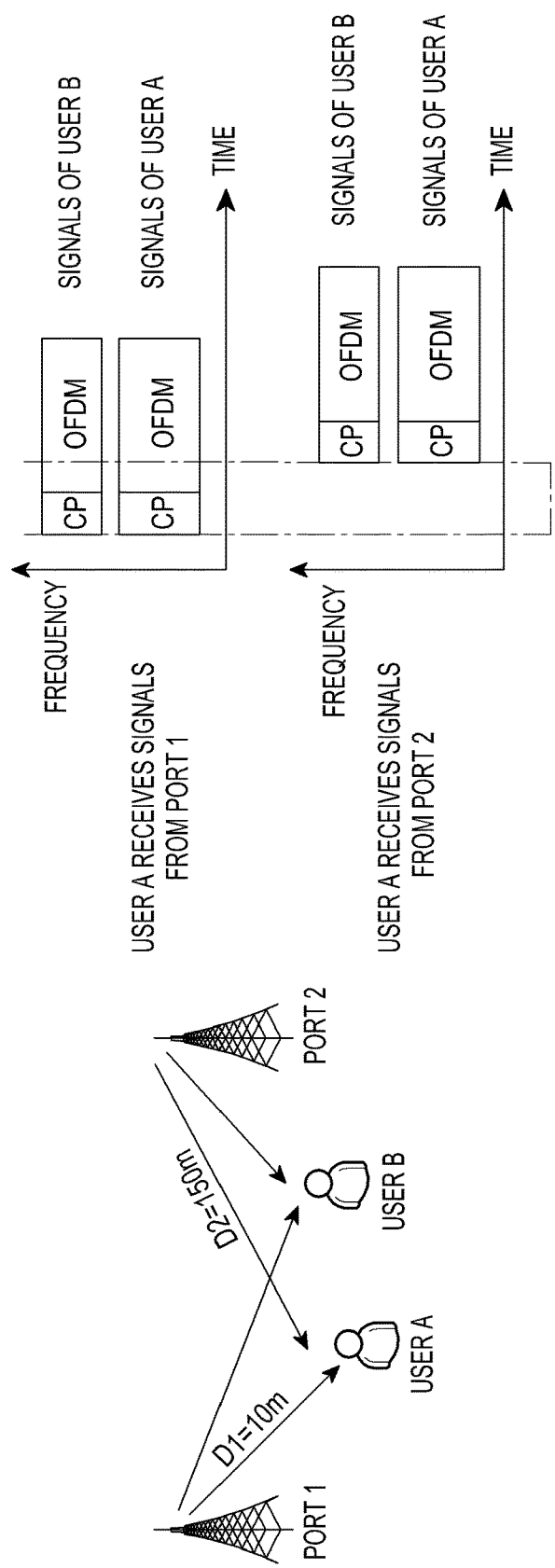
FIG. 3 is a schematic diagram illustrating a distributed antenna system based on OFDM modulation according to an embodiment of the present disclosure.

At first, a distributed antenna system based on OFDM modulation is shown in FIG. 3. In the network, data of two users is simultaneously transmitted through two antennas 1 and 2 by adopting OFDMA method. Because there is a distance difference between distances from the user to each of the two antennas, there is a time difference between two paths of signals (from antennas 1 and 2) received by the user (such as user A) at the receiving end, the time difference is called a time-delay difference. If the distribution of the users and the antennas is shown in FIG. 3, the time-delay difference at user A is τ=(D2−D1)/3*108=0.46 µs, in which, 3*108 m/s is the speed of light. If parameters used by the system are shown in table 1, it can be seen that the time-delay difference exceeds the CP length, and the received signals are shown in the right side of the FIG. 3. According to the OFDM features, it can be known that the received signals will suffer serious ICI and ISI, which may lead to a significant loss of the OFDM system performance.

Figure 4:
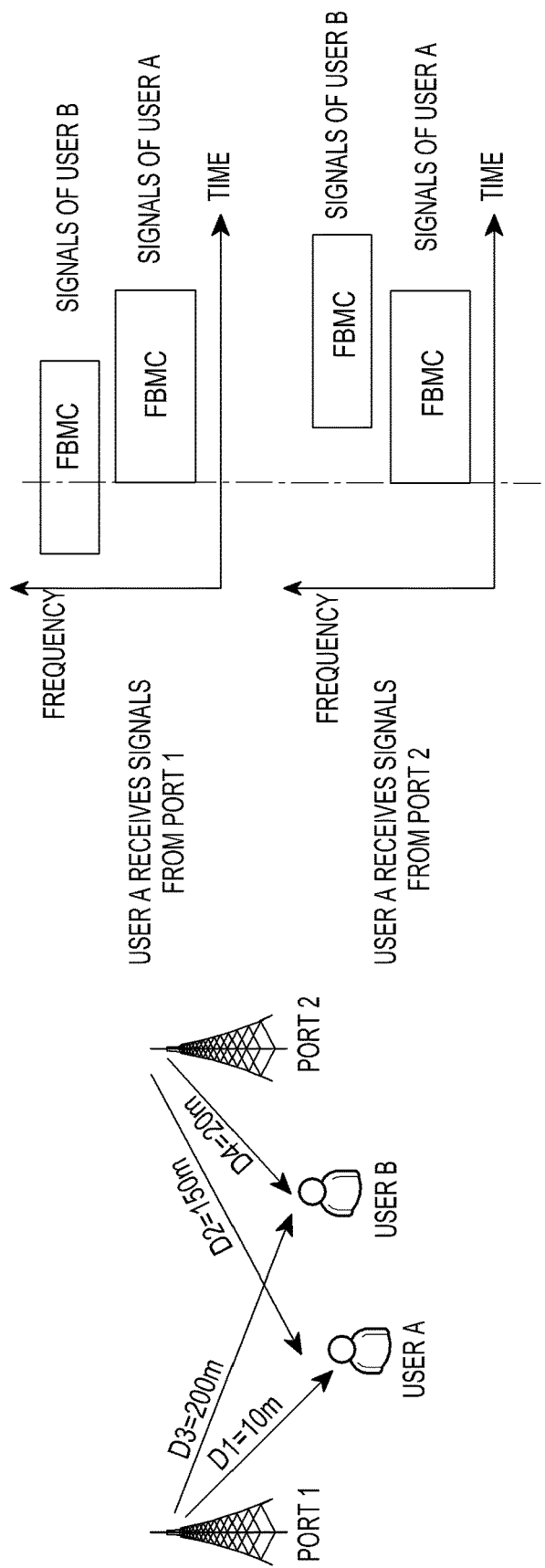
FIG. 4 is a schematic diagram illustrating a first proactive cooperative transmission method based on filter bank multiple carrier (FBMC) according to an embodiment of the present disclosure.

The proactive cooperative transmission method provided by embodiments of the present disclosure may dynamically change the transmitting time for transmitting signals of a user by each of the antennas or dynamically adjust modulation waveform parameters, so as to guarantee that the signals of the user generate less interference at the receiving end. In the method, the FBMC modulation with excellent time-frequency localization is used. The FBMC modulation may better support the adjacent frequency asynchronous transmission. An implementation of the method may include: when the network side detects that there is a larger time-delay difference from multiple antennas to a user, the transmitting time of one antenna may be changed. In the example, the antenna far away from the user is made to transmit the user signals in advance. As shown in FIG. 4, for user A, in the example, the transmitting time of the antenna 2 may be adjusted. For instance, the transmitting time of the antenna 2 may be advanced by τ=(D2−D1)/3e8=0.46 µs, after the adjustment, signals of user A respectively transmitted by the two antennas will arrive at the receiver of user A at the same time. Similarly, for user B, in the example, the transmitting time of the antenna 1 may be adjusted. For instance, the transmitting time of the antenna 1 may be advanced by τ=(D3−D4)/3e8=0.6 μs. It should be noted that, when the transmitting time of a user of each of the antennas is adjusted based on a user, data of another user (such as user B) received by one user (such as user A) may arrive at a receiver of the user with a great time-delay difference. As shown in the right side of FIG. 4, user A will receive two paths of data of user B, and the TDOA between the two paths of data is relatively larger. If the system uses the OFDM modulation technology, although data of user A may synchronously arrive the receiver of user A and avoids generating ICI and ISI, since data of user B asynchronously arrives the receiver of user A, the data of user B will generate ICI to the data of user A. Since the example of the present disclosure adopts the FBMC modulation technology, based on the excellent time-frequency localization, the interference leaked by the asynchronously arrived data of user B to the data of user A will be very small, user A only needs to demodulate the data on allocated resources. With the proactive cooperative transmission method of the present disclosure, a user in the distributed antenna system may always receive signals of the user from different antennas in a synchronous way. At the same time, since the system adopts FBMC modulation mode, each user may be kept from suffering interference caused by signals of other users on adjacent frequencies.

Figure 5:
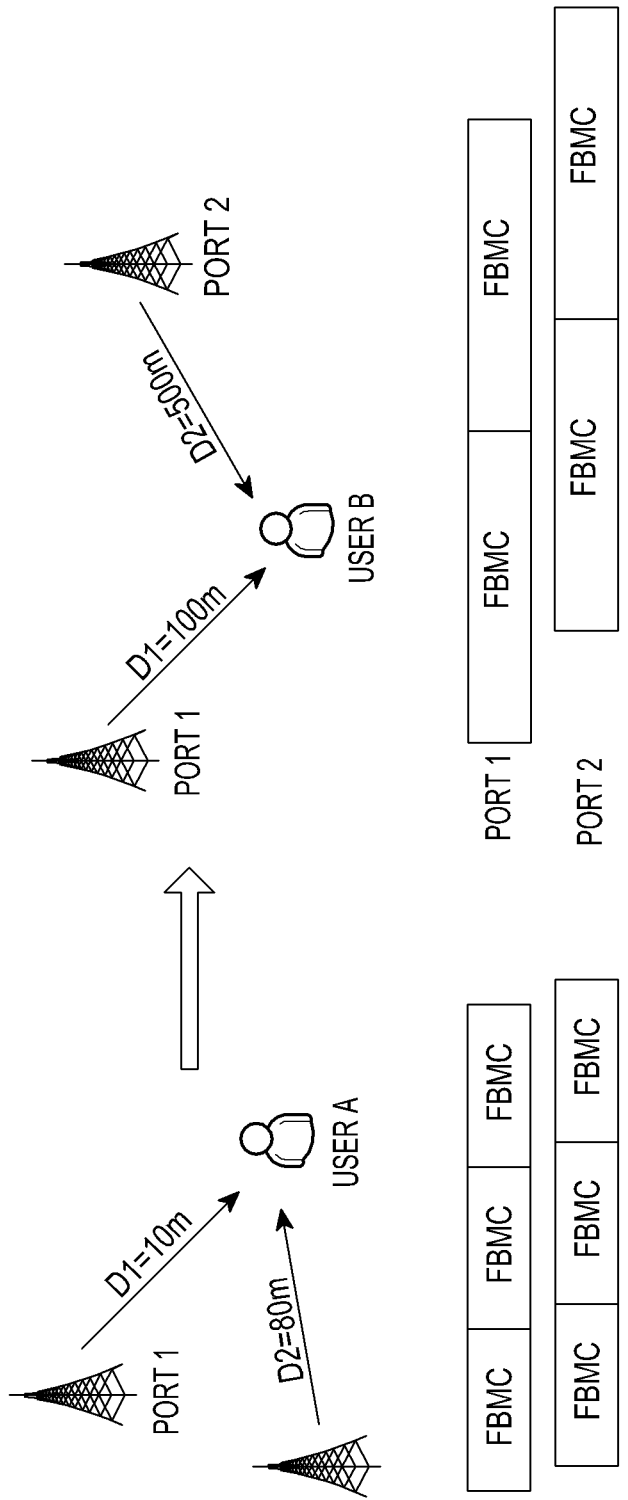
FIG. 5 is a schematic diagram illustrating a second proactive cooperative transmission method based on FBMC according to an embodiment of the present disclosure.

Besides above mentioned proactively adjusting transmitting time of an antenna, another implementation may include: the system proactively adjusts used FBMC waveform parameters. The implementation utilizes the inherent anti-ISI feature of the FBMC waveform. Under the delay spread of multiple signals, the FBMC may fine control the generated ISI. Thus the reception reliability may be guaranteed. The anti-ISI feature of the FBMC waveform depends on the specific delay spread parameters of the channel, when the maximal time delay is smaller compared to the symbol length, the FBMC may guarantee the reception reliability. However when the maximal time delay is larger compared to the symbol length, the FBMC will be faced with a higher ISI, which will lead to the reception failure. In the multiple antenna system of the present disclosure, since the user position is random, the time-delay difference of signals transmitted from multiple antennas may be different. Therefore, in the method provided by the present disclosure, multiple groups of FBMC waveform with different lengths may be defined, for example, K=2 and K=4, thus the network may select matched waveform according to used antenna time-delay difference. As shown in the left side of FIG. 5, when the time-delay difference between two antennas is small: τ=(D1−D2)/3e8=0.06 μs, the system uses the shorter FBMC waveform (for example, K=2). when the time-delay difference between two antennas is large, τ=(D2−D1)/3e8=1.33 μs, the system may dynamically adjust selected FBMC waveform (for example K=4), as shown in the right side of FIG. 5. Although the time-delay difference between two antennas is still 1.33 μs, because the FBMC waveform of which K=4 has a better anti-delay-spread capacity than the FBMC waveform of which K=2, the proactive cooperative transmission method may well solve the time-delay difference problem of the multiple antennas.

In a third example, the measurement, feedback and adjustment for an antenna delay will be described.

In the third example, the proactive cooperative transmission method adjusts the transmitting time of an antenna or modulation waveform parameters according to the time delay from each of the antennas to the user. Consequently, it is required for the network to obtain a time-delay difference from each of the antennas to the user first. There are multiple methods for obtaining the time-delay difference, and a method utilizing user measurement and feedback will be described in the example.

The network allocates an independent reference signal for each antenna, for example, the reference signal may be a channel state information reference signal (CSI-RS) in the LTE system. The reference signal is transmitted at a reference time which is the same for all users, so the user may always obtain a transmission time delay corresponding to the antenna by measuring the reference signal. A group of time-delay difference thresholds may be predefined, and when the user finds that a time-delay difference between different antennas exceeds a time-delay difference threshold, a feedback is initiated, and a quantified time-delay difference is fed back to the network. When the time-delay difference is to be calculated, the antenna with the minimal time delay may be selected as the reference, and then the time-delay difference between other antennas and the reference antenna is calculated. When the user feeds back the time-delay difference, it is necessary for the user to simultaneously indicate an index of the reference antenna and index(es) of other relevant antenna(s) (namely the antenna(s) triggering the feedback). For example, in a dual-antenna distributed antenna system, the physical distance between the two antennas is 500 m, then the maximal time-delay difference is τ=500/3e8=1.67 μs. The thresholds may be set as 0.6 μs and 1.2 μs. The user feedback and network transmission time adjustment may refer to the following table 3. In table 3, the antenna time delay measurement, feedback and adjustment is shown. Based on the method, the time-delay difference of signals received by the user in the system will be always controlled within 0.6 μs.

TABLE 3

| Time delay | τ < 0.6 us | 0.6 us < τ < 1.2 us | 1.2 us < τ |
|---|---|---|---|
| User feedback | No feedback | Feedback information bit "0" | Feedback information bit "1" |
| Transmitting time | No timing advance | 0.6 μs timing advance | 1.2 μs timing advance |

Another preferable proactive cooperative transmission method may include the following: a strategy selected by the system is that a right FBMC parameter, such as a different repetition factor K, is selected based on the feedback. It should be noted that, the setting of the thresholds is only an example, and the specific thresholds may be calculated by taking into account of selected FBMC parameter and deployment scenario. The threshold selection rule is that the reliability of signal reception should be ensured with least feedback overhead (larger threshold spacing), namely it may be ensured that the interference caused by the time-delay difference is always controlled within the range not affecting the reception. At the same time, the setting of the number of the thresholds should try to reduce the complexity of network implementation.

In a fourth example, how to perform the signal collision avoidance will be described.

Figure 6:
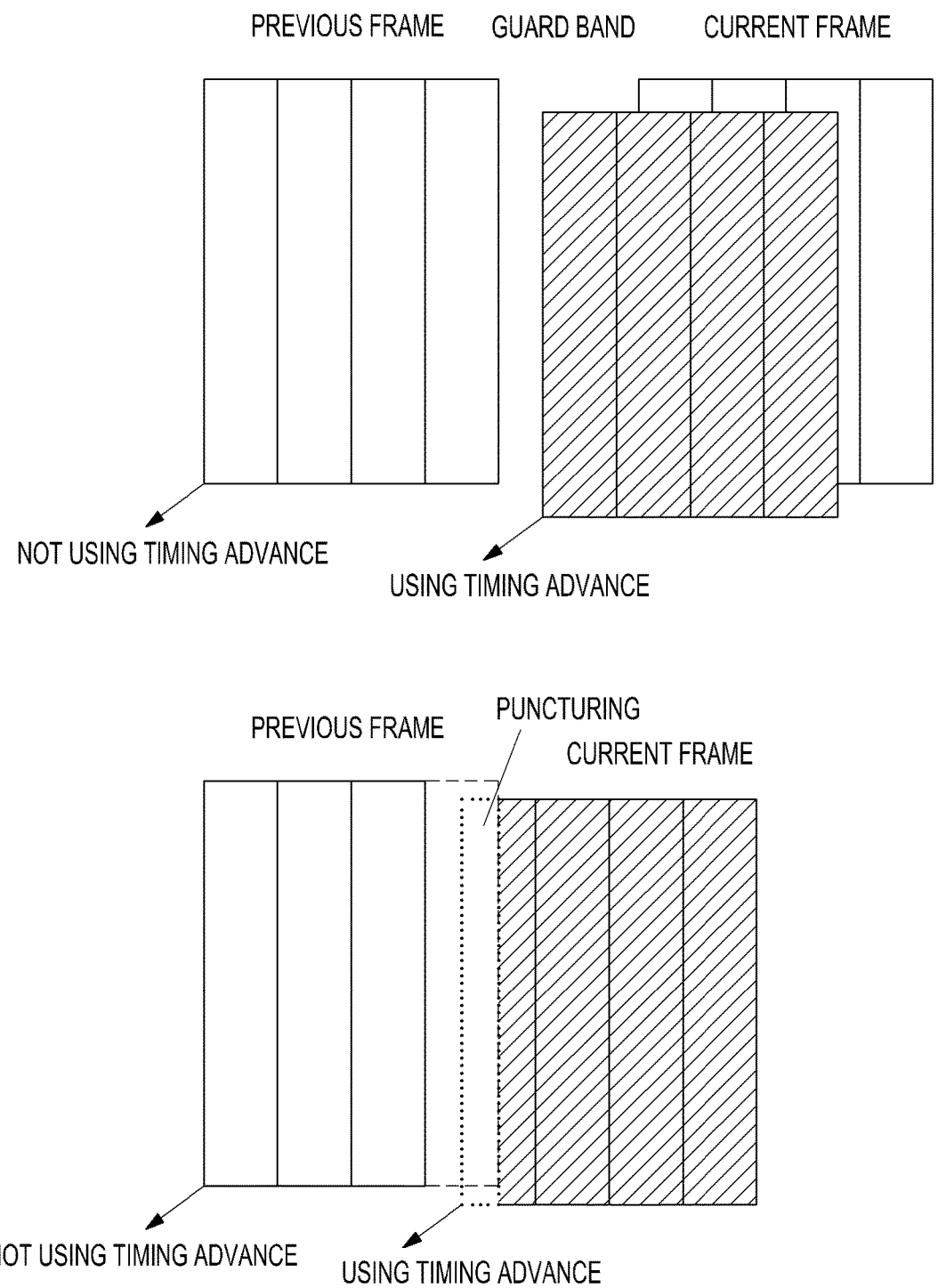
FIG. 6 is a schematic diagram illustrating signal collision avoidance under a proactive cooperative transmission according to an embodiment of the present disclosure.

In a communication system which takes frame as basic unit, the data transmission unit of each user is a transmission block, and one transmission block occupies at least one frame, one frame is composed of multiple modulation symbols (OFDM or FBMC). The network may schedule one or more users at different frames, and multiple users may be frequency division multiplexed. Because above mentioned proactive cooperative transmission method (adjusting transmitting time) is used, the users scheduled on two frames may be different, thus the transmitting time used by an antenna on the two frames may be different. If the timing advance is used for the current frame, and no timing advance is used for the previous frame, the current frame will collide with the previous frame. If the current frame and the previous frame use different frequencies, the collision will not cause interference. On the contrary, if the frequencies used by current frame are the same as that used by the previous frame or part of frequencies used by current frame are the same as part of that used by the previous frame, the collision will cause interference. In this case, a method for puncture the current frame may be used. The network will discard part of signals of the current frame, and retain signals of the previous frame. Because the antenna using the timing advance is generally far away from the user, the influence brought about by puncturing the current frame will be less than that brought about by puncturing the previous frame. Another solution lies in setting a guard band between two frames. No signal is transmitted in the guard band so as to protect the signals transmitted with timing advance. The two methods are shown in FIG. 6, and FIG. 6 is a schematic diagram illustrating the signal collision avoidance.

In a fifth example, channel measurement reference signal protection will be described.

Figure 7:
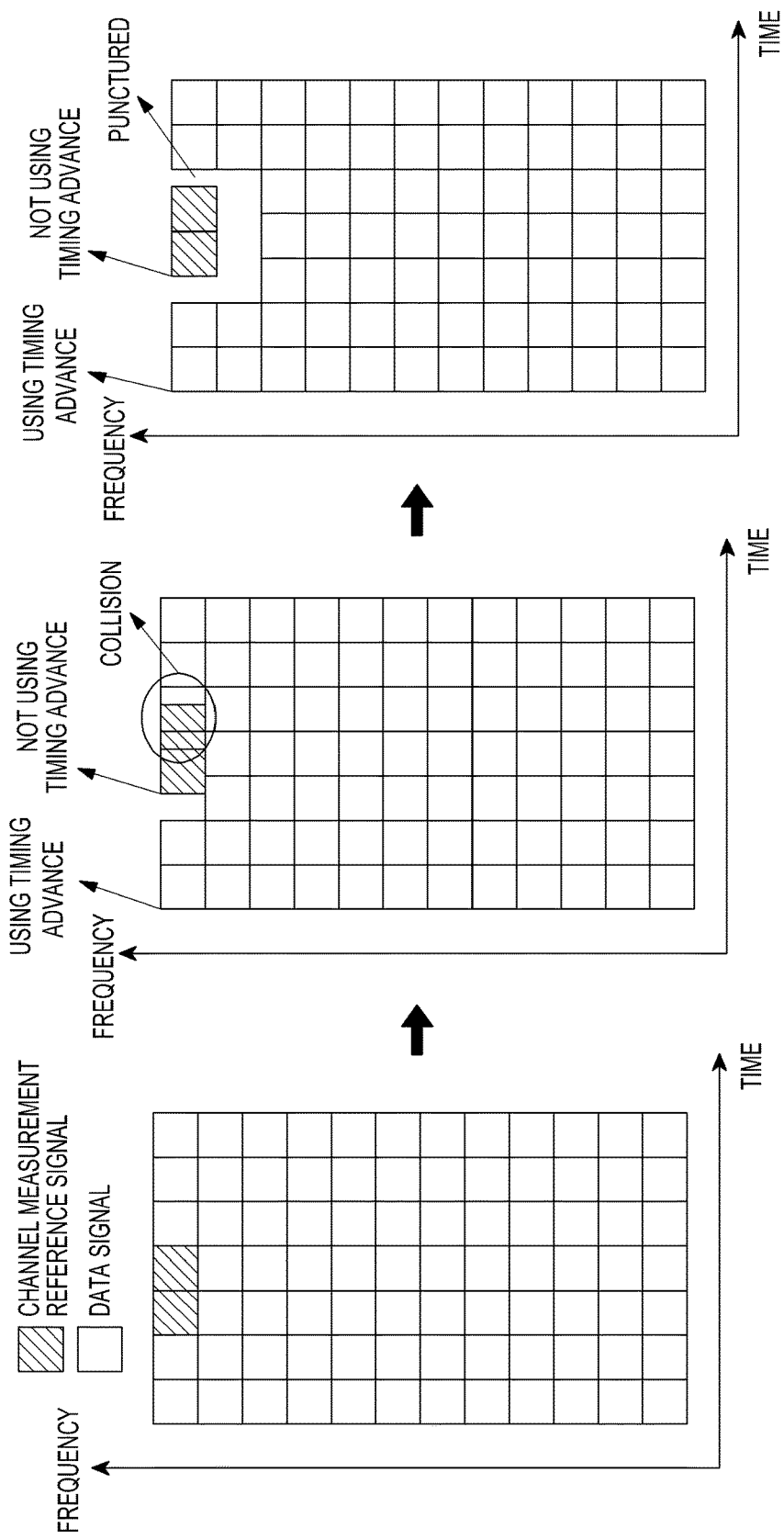
FIG. 7 is a schematic diagram illustrating reference signal protection under a proactive cooperative transmission according to an embodiment of the present disclosure.

According to the description in the third example, each of the antennas transmits a channel measurement reference signal at reference time which is the same for all users. Because the channel measurement reference signal may be multiplexed into the same frequency band with a data signal, which means when the data signal is transmitted with timing advance, the data signal will collide with the channel measurement reference signal. As shown in FIG. 7, when the data signal collides with the channel measurement reference signal, in the example, a corresponding symbol of the data signal will be punctured to protect the reference signal. Due to each carrier of the FBMC will suffer the interference caused by an adjacent carrier, a data signal adjacent to the reference signal in time domain will be punctured first, and then an adjacent carrier of the reference signal will be punctured so as to avoid the interference of the adjacent carrier. The network may inform the user of the puncture information via a control signaling. For example, the network side may indicate the timing advance value used by an antenna, and according to the timing advance, the user may calculate the data symbol to be punctured.

Corresponding to above mentioned method, the embodiments of the present disclosure further provide a base station and a terminal, which will be described with reference to accompanying drawings.

An example of an inner structure of a base station according to an embodiment of the present disclosure will be described with reference to FIG. 8.

Figure 8:
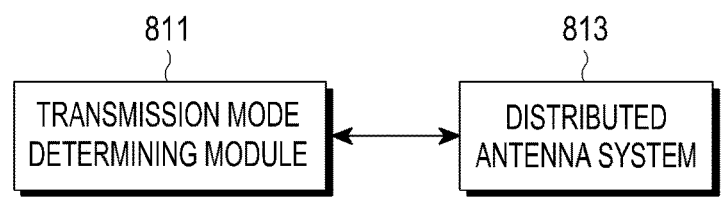
FIG. 8 is a schematic diagram illustrating an example of an inner structure of a base station according to an embodiment of the present disclosure.

FIG. 8 is a schematic diagram illustrating an example of an inner structure of a base station according to an embodiment of the present disclosure.

Referring to FIG. 8, a base station 800 may include a transmission mode determining module 811 and a distributed antenna system 813. The distributed antenna system 813 includes at least two antennas.

The transmission mode determining module 811 is configured to, based on the channel condition between each of the at least two antennas in the distributed antenna system 813 and a terminal, determine a signal transmission mode to be used by each of the at least two antennas.

So, each of the at least two antennas included in the distributed antenna system 813 transmits signals to one or more terminals via each of the antennas using the signal transmission mode which is determined in the transmission mode determining module 811.

While the transmission mode determining module 811 and the distributed antenna system 813 are described as separate units, it is to be understood that this is merely for convenience of description. In other words, the base station 800 may be implemented with one processor.

An example of an inner structure of a base station according to an embodiment of the present disclosure has been described with reference to FIG. 8, and an example of an inner structure of a terminal according to an embodiment of the present disclosure will be described with reference to FIG. 9.

Figure 9:
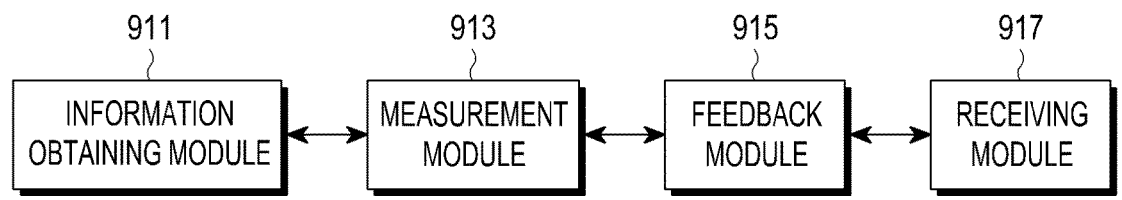
FIG. 9 is a schematic diagram illustrating an example of an inner structure of a terminal according to an embodiment of the present disclosure.

FIG. 9 is a schematic diagram illustrating an example of an inner structure of a terminal according to an embodiment of the present disclosure.

Referring to FIG. 9, a terminal 900 includes an information obtaining module 911, a measurement module 913, a feedback module 915 and a receiving module 917.

The information obtaining module 911 is configured to receive spatial distribution information for antennas included in a distributed antenna system included in a base station and reference signal information from the base station.

The measurement module 913 is configured to measure a reference signal based on the spatial distribution information for the antennas, and obtain a TDOA for the signals transmitted from each of the antennas to the terminal.

The feedback module 915 is configured to return a channel condition between each of the antennas and the terminal 900 to the base station based on the TDOA.

The receiving module 917 is configured to receive signals from each of the antennas, a transmission mode which is applied to the signals is determined based on the channel condition between each of the antennas and the terminal 900.

While the information obtaining module 911, the measurement module 913, a feedback module 915, and the receiving module 917 are described as separate units, it is to be understood that this is merely for convenience of description. In other words, two or more of the information obtaining module 911, the measurement module 913, a feedback module 915, and the receiving module 917 may be incorporated into a single unit. The terminal 900 may be implemented with one processor.

An example of an inner structure of a terminal according to an embodiment of the present disclosure has been described with reference to FIG. 9, and another example of an inner structure of a base station according to an embodiment of the present disclosure will be described with reference to FIG. 10.

Figure 10:
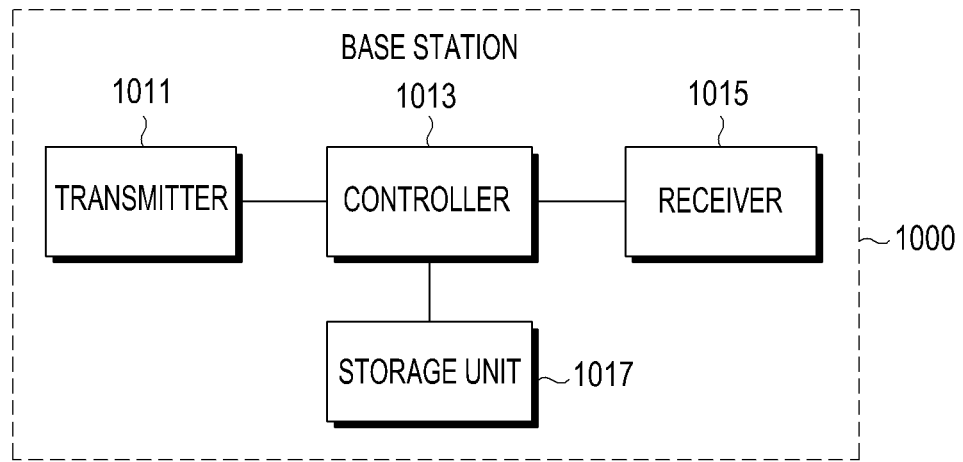
FIG. 10 is a schematic diagram illustrating another example of an inner structure of a base station according to an embodiment of the present disclosure.

FIG. 10 is a schematic diagram illustrating another example of an inner structure of a base station according to an embodiment of the present disclosure.

Referring to FIG. 10, a base station 1000 includes a transmitter 1011, a controller 1013, a receiver 1015, and a storage unit 1017.

The controller 1013 controls the overall operation of the base station 1000. More particularly, the controller 1013 controls the base station 1000 to perform an operation of transmitting/receiving a signal in a wireless communication system supporting a distributed antenna system according to an embodiment of the present disclosure, e.g., an operation related to an operation of transmitting/receiving a signal based on a cooperative transmission scheme in a wireless communication system supporting a distributed antenna system according to an embodiment of the present disclosure. The operation related to the operation of transmitting/receiving the signal based on the cooperative transmission scheme in the wireless communication system supporting the distributed antenna system according to an embodiment of the present disclosure is performed in the manner described with reference to FIGS. 1 to 7, and a description thereof will be omitted herein.

The transmitter 1011 transmits various signals, various messages, and the like to other entity, e.g., a terminal, and the like under a control of the controller 1013. The various signals, the various messages, and the like transmitted in the transmitter 1011 have been described in FIGS. 1 to 7, and a description thereof will be omitted herein.

The receiver 1015 receives various signals, various messages, and the like from other entity, e.g., a terminal, and the like under a control of the controller 1013. The various signals, the various messages and the like received in the receiver 1015 have been described in FIGS. 1 to 7, and a description thereof will be omitted herein.

The storage unit 1017 stores a program and various data necessary for the operation of the base station 1000, information related to the operation of transmitting/receiving the signal based on the cooperative transmission scheme in the wireless communication system supporting the distributed antenna system according to an embodiment of the present disclosure, and the like. The storage unit 1017 stores the various signals, the various messages, and the like received in the receiver 1015.

While the transmitter 1011, the controller 1013, the receiver 1015, and the storage unit 1017 are described as separate units, it is to be understood that this is merely for convenience of description. In other words, two or more of the transmitter 1011, the controller 1013, the receiver 1015, and the storage unit 1017 may be incorporated into a single unit. The base station 1000 may be implemented with one processor.

Another example of an inner structure of a base station according to an embodiment of the present disclosure has been described with reference to FIG. 10, and another example of an inner structure of a terminal according to an embodiment of the present disclosure will be described with reference to FIG. 11.

Figure 11:
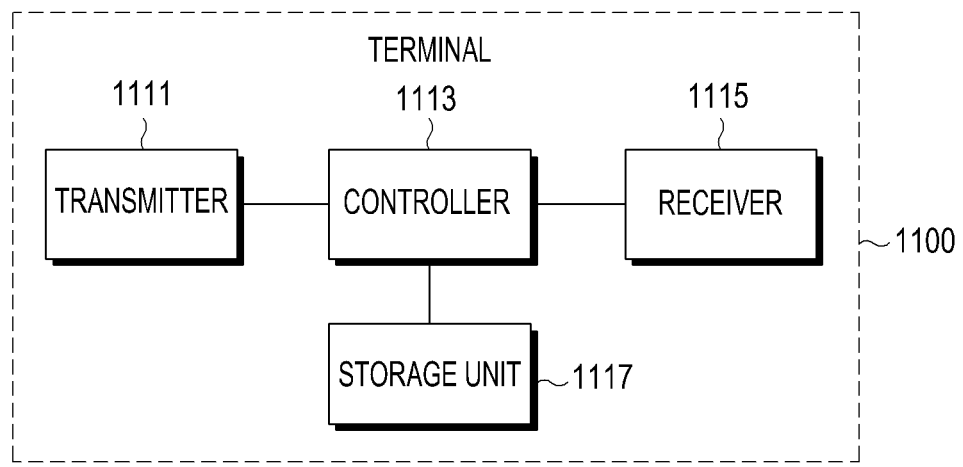
FIG. 11 is a schematic diagram illustrating another example of an inner structure of a terminal according to an embodiment of the present disclosure.

FIG. 11 is a schematic diagram illustrating another example of an inner structure of a terminal according to an embodiment of the present disclosure.

Referring to FIG. 11, a terminal 1100 includes a transmitter 1111, a controller 1113, a receiver 1115, and a storage unit 1117.

The controller 1113 controls the overall operation of the terminal 1100. More particularly, the controller 1113 controls the terminal 1100 to perform an operation of transmitting/receiving a signal in a wireless communication system supporting a distributed antenna system according to an embodiment of the present disclosure, e.g., an operation related to an operation of transmitting/receiving a signal based on a cooperative transmission scheme in a wireless communication system supporting a distributed antenna system according to an embodiment of the present disclosure. The operation related to the operation of transmitting/receiving the signal based on the cooperative transmission scheme in the wireless communication system supporting the distributed antenna system according to an embodiment of the present disclosure is performed in the manner described with reference to FIGS. 1 to 7, and a description thereof will be omitted herein.

The transmitter 1111 transmits various signals, various messages, and the like to other entity, e.g., a base station, and the like under a control of the controller 1113. The various signals, the various messages, and the like transmitted in the transmitter 1111 have been described in FIGS. 1 to 7, and a description thereof will be omitted herein.

The receiver 1115 receives various signals, various messages, and the like from other entity, e.g., a base station, and the like under a control of the controller 1113. The various signals, the various messages and the like received in the receiver 1115 have been described in FIGS. 1 to 7, and a description thereof will be omitted herein.

The storage unit 1117 stores a program and various data necessary for the operation of the terminal 1100, information related to the operation of transmitting/receiving the signal based on the cooperative transmission scheme in the wireless communication system supporting the distributed antenna system according to an embodiment of the present disclosure, and the like. The storage unit 1117 stores the various signals, the various messages, and the like received in the receiver 1115.

While the transmitter 1111, the controller 1113, the receiver 1115, and the storage unit 1117 are described as separate units, it is to be understood that this is merely for convenience of description. In other words, two or more of the transmitter 1111, the controller 1113, the receiver 1115, and the storage unit 1117 may be incorporated into a single unit. The terminal 1100 may be implemented with one processor.

As is apparent from the foregoing description, an embodiment of the present disclosure enables to transmit/receive a signal in a wireless communication system supporting a distributed antenna system.

An embodiment of the present disclosure enables to transmit/receive a signal based on a cooperative transmission scheme in a wireless communication system supporting a distributed antenna system.

An embodiment of the present disclosure enables to transmit/receive a signal by considering channel quality in a wireless communication system supporting a distributed antenna system.

An embodiment of the present disclosure enables to transmit/receive a signal thereby synchronizing signal reception timing points of a plurality of antennas in a wireless communication system supporting a distributed antenna system.

An embodiment of the present disclosure enables to transmit/receive a signal thereby decreasing time delay of signals which are received through a plurality of antennas in a wireless communication system supporting a distributed antenna system.

An embodiment of the present disclosure enables to transmit/receive a signal thereby guaranteeing reception reliability in a wireless communication system supporting a distributed antenna system.

An embodiment of the present disclosure enables to transmit/receive a signal thereby increasing spectrum efficiency in a wireless communication system supporting a distributed antenna system.

An embodiment of the present disclosure enables to transmit/receive a signal thereby increasing an effective transmission rate in a wireless communication system supporting a distributed antenna system.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a compact disk (CD), a digital versatile disk (DVD), a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method by a base station in a wireless communication system, the method comprising:
    transmitting, to a terminal, reference signal information and spatial division information of at least one antenna, wherein the spatial division information is used for measuring at least one reference signal;
    receiving, from the terminal, channel condition information between at least one antenna and the terminal, wherein the channel condition information comprises a time difference of arrival (TDOA) of the at least one reference signal obtained by the terminal;
    determining a signal transmission mode of the at least one antenna based on the TDOA; and
    transmitting, to the terminal, at least one signal based on the signal transmission mode.

2. The method of claim 1, wherein transmitting the at least one signal comprises generating signal waveform, and
    wherein the signal waveform possesses a time-frequency localization property.

3. The method of claim 1, wherein transmitting the at least one signal comprises transmitting the at least one signal using a modulation method, and
    wherein the modulation method comprises at least one of prototype filter based single-carrier modulation, filter bank multi-carrier (FBMC) modulation, or prototype filter based multi-carrier modulation.

4. The method of claim 1, wherein the TDOA includes at least one difference between time delays from the at least one antenna to the terminal.

5. The method of claim 1, further comprising setting a guard time or a puncture operation between different subframes.

6. The method of claim 1,
    wherein the channel condition information further comprises at least one modulation waveform parameter of the at least one antenna and a corresponding multi-antenna transmission mode, and
    wherein determining the signal transmission mode further comprises determining the at least one modulation waveform parameter of the at least one antenna and the corresponding multi-antenna transmission mode.

7. The method of claim 6, wherein the modulation waveform parameters comprise a modulation waveform length, multi-carrier spacing and a repetition factor used by modulation signals.

8. A method by a terminal in a wireless communication system, the method comprising:
    receiving, from a base station, spatial distribution information of at least one antenna and reference signal information;
    measuring at least one reference signal based on the spatial distribution information;
    obtaining a time difference of arrival (TDOA) of the at least one reference signal;
    transmitting, to the base station, channel condition information between the at least one antenna and the terminal based on the TDOA; and
    receiving at least one signal from the at least one antenna using a signal transmission mode,
    wherein the signal transmission mode is determined based on the channel condition information.

9. The method of claim 8, wherein transmitting, to the base station, the channel condition information comprises:
    setting the TDOA as the channel condition information, and transmitting the channel condition information to the base station; or
    determining at least one modulation waveform parameter and a multi-antenna transmission mode based on the TDOA, and setting the at least one modulation waveform parameters and the multi-antenna transmission mode as the channel condition information, and transmitting the channel condition information to the base station.

10. A base station in a wireless communication system, the base station comprising:
- at least one antenna;
- a receiver;
- a transmitter; and
- a controller configured to control at least one of the receiver or the transmitter, wherein the controller is configured to:
  - transmit, to a terminal, reference signal information and spatial division information of the at least one antenna, the spatial division information is used for measuring at least one reference signal,
  - receive, from the terminal, channel condition information between at least one antenna and the terminal, wherein the channel condition information comprises a time difference of arrival (TDOA) of the at least one reference signal obtained by the terminal,
  - determine a signal transmission mode of the at least one antenna based on the TDOA, and
  - transmit, to the terminal, at least one signal based on the signal transmission mode.

11. The base station of claim 10, wherein the controller further configured to:
- generate signal waveform, and
- wherein the signal waveform possesses a time-frequency localization property.

12. The base station of claim 10, wherein the controller further configured to transmit the at least one signal using a modulation method, and
- wherein the modulation method comprises at least one of prototype filter based single-carrier modulation, filter bank multi-carrier (FBMC) modulation, or prototype filter based multi-carrier modulation.

13. The base station of claim 10, wherein the TDOA includes at least one difference between time delays from the at least one antenna to the terminal.

14. The base station of claim 10, wherein the controller is further configured to set a guard time or a puncture operation between different sub-frames.

15. The base station of claim 10,
- wherein the channel condition information further comprises at least one modulation waveform parameter of the at least one antenna and a corresponding multi-antenna transmission mode, and
- wherein the controller is further configured to determine the at least one modulation waveform parameter of the at least one antenna and the corresponding multi-antenna transmission mode.

16. The base station of claim 15, wherein the modulation waveform parameters comprise a modulation waveform length, multi-carrier spacing and a repetition factor used by modulation signals.

17. A terminal in a wireless communication system, the terminal comprising:
- a receiver;
- a transmitter; and
- a controller configured to control at least one of the receiver or the transmitter, wherein the controller configured to:
  - receive, from a base station, spatial distribution information of at least one antenna and reference signal information;
  - measure at least one reference signal based on the spatial distribution information;
  - obtain a time difference of arrival (TDOA) of the at least one reference signal;
  - transmit, to the base station, channel condition information between the at least one antenna and the terminal based on the TDOA; and
  - receive at least one signal from the at least one antenna using a signal transmission mode,
- wherein the signal transmission mode is determined based on the channel condition information.

18. The terminal of claim 17, wherein the controller is further configured to:
- set the TDOA as the channel condition information and transmit the channel condition information to the base station, or
- determine at least one modulation waveform parameter and a multi-antenna transmission mode based on the TDOA, and set the at least one modulation waveform parameter and the multi-antenna transmission mode as the channel condition information, and transmit the channel condition information to the base station.

* * * * *